United States Patent
Schumm et al.

(10) Patent No.: US 6,517,613 B1
(45) Date of Patent: Feb. 11, 2003

(54) TANK FOR CONTAINING GRANULAR ABSORBERS FOR CLEANING GASES

(75) Inventors: Bruno Schumm, Rodgau (DE); Bernd Reichert, Niddatal (DE)

(73) Assignee: Metallgesellschaft AG, Frankfurt am Main (DE)

( * ) Notice: Subject to any disclaimer, the term of this patent is extended or adjusted under 35 U.S.C. 154(b) by 0 days.

(21) Appl. No.: 09/763,040

(22) PCT Filed: Nov. 4, 1999

(86) PCT No.: PCT/EP99/08453

§ 371 (c)(1),
(2), (4) Date: Oct. 9, 2001

(87) PCT Pub. No.: WO00/27504

PCT Pub. Date: May 18, 2000

(30) Foreign Application Priority Data

Nov. 10, 1998 (DE) .......................... 198 51 660

(51) Int. Cl.[7] .............................................. B01D 53/04
(52) U.S. Cl. ............................ 96/131; 55/516; 206/0.6
(58) Field of Search .................. 55/512, 516, 518, 55/519; 96/108, 131, 147, 154; 206/0.6, 0.7; 422/311; 210/283

(56) References Cited

U.S. PATENT DOCUMENTS

| 2,181,153 A | 11/1939 | Prickett | |
| 3,581,476 A | * 6/1971 | Rivers | 55/357 |
| 3,590,561 A | * 7/1971 | Marble | 55/484 |
| 3,982,326 A | 9/1976 | Squires | |
| 4,133,659 A | * 1/1979 | Beckman | 55/314 |
| 4,764,347 A | * 8/1988 | Milligan | 422/113 |
| 5,512,088 A | * 4/1996 | McKenzie | 55/518 |
| 6,086,659 A | * 7/2000 | Tentarelli | 422/179 |

FOREIGN PATENT DOCUMENTS

EP    0 158 748    10/1985

\* cited by examiner

*Primary Examiner*—David A. Simmons
*Assistant Examiner*—Frank M. Lawrence
(74) *Attorney, Agent, or Firm*—Norris McLaughlin & Marcus

(57) ABSTRACT

A tank for containing granular adsorbers for cleaning gases, wherein the tank has a gas inlet, a gas distributing chamber, at least one adsorption chamber defined by vertical, gas-permeable walls and containing a charge of adsorbers in bulk, an outflow chamber and a gas outlet. Each gas-permeable wall consists of horizontal rails of plastic arranged at a distance above one another, through which pass vertical centering rods of plastic. At least half of the rails have the cross-sectional profile of an inverted U. In the tank at least one vertical supporting wall is arranged, which divides the adsorption chamber. At least the surface of the supporting wall consists of plastic.

6 Claims, 1 Drawing Sheet

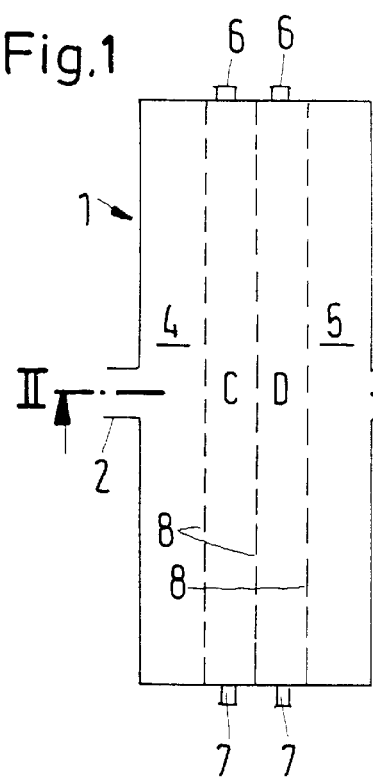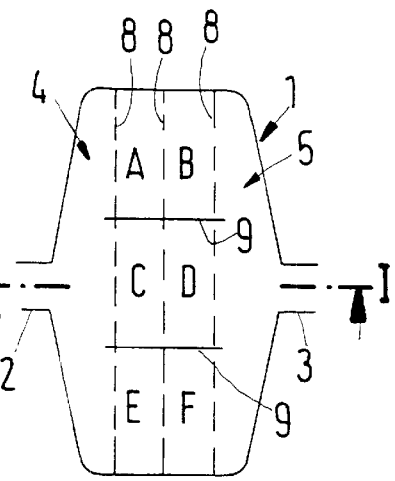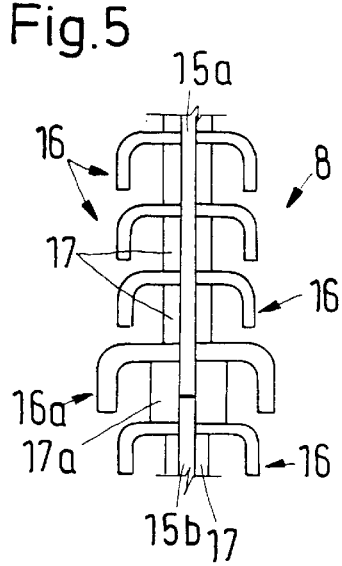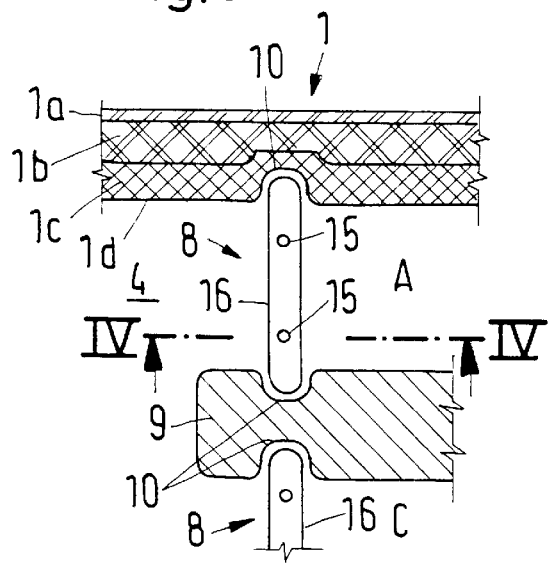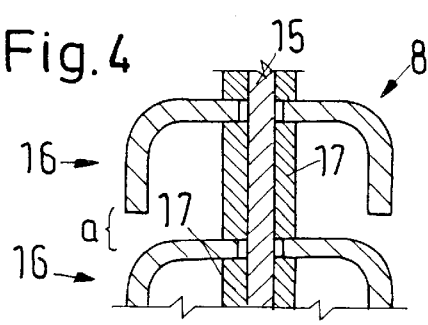

TANK FOR CONTAINING GRANULAR ABSORBERS FOR CLEANING GASES

BACKGROUND OF THE INVENTION

The invention relates to a tank for containing granular adsorbers for cleaning gases, wherein the tank has a gas inlet, a gas distributing chamber free of adsorbers, at least one adsorption chamber defined by vertical, gas-permeable walls and containing adsorbers in bulk, an outflow chamber, and a gas outlet.

Adsorber tanks of this kind are known, and described for example in EP-B-0158748. The invention is addressed to the problem of forming the tank of the kind referred to above for adsorbers in bulk with a depth of several meters, and at the same time provide such that corrosion by aggressive gas components will be prevented and the temperatures in the tank will be able to increase up to about 200° C.

SUMMARY OF THE INVENTION

The problem is solved by the invention by the fact that each gas-permeable wall consists of horizontal plastic rails arranged at a distance one above the other through which the vertical centering rods of plastic are passed, at least half of the rails and, for example, all rails, have the cross-sectional profile of an inverted U, that in the tank at least one vertical supporting wall is arranged which divides the adsorption chamber, the gas-permeable walls being fastened to the supporting wall, and by the fact that at least the surface of the supporting wall consists of plastic.

DETAILED DESCRIPTION

In the case of adsorbers of this kind it is important that the walls be made sufficiently stable, because the bulk material enclosed between the walls exerts considerable forces against the walls on account of the considerable depth of the bulk material. It would not be sufficient to configure the gas-permeable walls only as plastic plates perforated in a sieve-like manner in order to achieve resistance to corrosion, because the stability of these plates, especially at high temperatures up to about 200° C., can only be poor. Constructing the walls from rails with a U-shaped profile provides for high stability. The pressure loss of these gas-permeable walls can easily be chosen such that a uniform gas distribution is achieved in the tank. All parts of the walls and preferably all furnishings in the tank can be made from glass fiber-reinforced plastic.

The choice of the depth of the adsorber material is rather free; it is usually in the range of 2 to 30 m and preferably 3 to 25 m. At these depths one or more vertical supporting walls are needed in order to limit the width of the gas-permeable walls and thus improve their strength. The adsorber can consist entirely or partially, for example, of active carbon, a mixture of active carbon and inert rock, or of zeolites.

BRIEF SUMMARY OF THE DRAWINGS

Possibilities for the configuration of the tank are explained by means of the drawing, wherein:

FIG. 1 is a vertical section through the tank, taken along line I—I in FIG. 2,

FIG. 2 a horizontal section through the tank of FIG. 1, taken along line II to II in FIG. 1, FIG. 3 an enlarged detail from FIG. 2, FIG. 4 a vertical section along line IV—IV in FIG. 3, and FIG. 5 a divisible wall represented similarly to FIG. 4.

The tank represented in the drawing for containing granular adsorbers has an external tank wall (1) with a gas inlet (2) and a gas outlet (3). The gas entering through the inlet (2) first enters a gas distribution chamber (4) which is kept free of adsorbers. The granular adsorber is contained in adsorption chambers (A, B, C, D, E, F), each chamber having an upper filler connection (6) and a lower removal connection (7). Each chamber has gas-permeable walls (8) which are arranged on vertical supporting walls (9). The supporting walls (9) are perpendicular to the gas-permeable walls. The supporting walls (9) can be made either impermeable or permeable to gas. For greater clarity the vertical supporting wall (9) is not shown in FIG. 1. The gas to be treated, which comes from the inlet (2) and flows approximately horizontally through the adsorption chambers where it is at least partially freed of contaminants, passes then into the outflow chamber (5) that is free of adsorbers, before it leaves the tank through the gas outlet (3).

FIG. 3 shows in cross section the outer wall of the tank (1), which consists of several layers; all layers can be formed entirely or largely of plastic-base materials. For the weatherproof outside layer (1a), synthetic resins, for example, can be used. It is followed by a thermal insulating layer (1b) of plastic or mineral fiber mats, for example, and a mechanically stable layer (1c) of, for example, glass fiber-reinforced plastic. The inside (1d) of the wall (1) can consist, for example, of a synthetic resin (chemical protective layer).

The gas-permeable wall (8) represented schematically in FIG. 3, which is between the adsorption chamber (A) and the gas distribution chamber (4) has rails (16) held by vertical centering rods (15), cf. FIG. 4. The cross-sectional profile of the rails is an inverted U, so that they cannot hold any fluids. The rails are spaced apart from one another by supporting sleeves (17) which surround one of the centering rods. Thus, there is a space between adjacent rails (16) for the gas, the width a of which is usually 1 to 6 mm.

How the wall (8) is made up of sections and can be taken apart is represented schematically in FIG. 5. For simplicity, the hatching used in FIG. 4 is omitted in FIG. 5. According to FIG. 5, the centering rod consists of the upper rod (15a) and the lower rod (15b) which are releasably held together in a large sleeve (17a). The sleeve (17a) is joined to the bottom rod (15b) but not to the upper rod (15a). One rail (16a) is joined to the upper rod (15a), so that this rail and the rails (16) above it are drawn away as a wall section when the rod (15a) is raised up. A wall (8) can in this manner consist, for example, of 3 to 30 wall sections stacked and releasable from one another. This facilitates assembly and disassembly.

The supporting wall (9) and also the tank wall (1) have vertical grooves (10) which hold the wall (8). The wall can additionally be clamped in the grooves, but this has not been shown in the drawing to avoid cluttering it. The number of adsorber chambers (A) to (F) is indeterminate and in practice there are, for example, about 2 to 20; usually a plurality of supporting walls (9) are used.

We claim:

1. Tank for containing granular adsorbers for cleaning gases, the container having a gas inlet, a gas distribution chamber free of adsorbers, at least one adsorption chamber defined by vertical, gas-permeable walls and containing a bulk charge of adsorbers, an outflow chamber and a gas outlet, wherein each gas-permeable wall is constructed of horizontal rails of plastic arranged at a distance above one another, through which vertical centering rods of plastic are passed, at least half of the rails having the cross-sectional profile of an inverted U, at least one vertical supporting wall is disposed in the tank and divides the adsorption chamber; the gas-permeable walls being fastened to the supporting wall, and wherein at least the surface of the supporting wall is of plastic.

2. Tank according to claim 1, wherein the supporting wall has grooves in which the gas-permeable walls are engaged.

3. Tank according to claim 1 wherein the gas-permeable walls are formed of wall sections arranged releasably one over the other.

4. Tank according to claim 1 wherein the rails are made of glass fiber reinforced plastic.

5. Tank according to claim 1 wherein the wall of the tank has a covering of glass fiber reinforced plastic.

6. Tank according to claim 1 wherein said tank contains bulk adsorbers which bulk adsorbers have a depth of 2 to 30 meters.

* * * * *